United States Patent

Sugita

[11] Patent Number: 5,860,135
[45] Date of Patent: Jan. 12, 1999

[54] FILE MANAGING DEVICE OF A NON-VOLATILE MEMORY, A MEMORY CARD AND METHOD FOR CONTROLLING A FILE SYSTEM

[75] Inventor: Masahiro Sugita, Tokyo, Japan

[73] Assignee: NEC Corporation, Tokyo, Japan

[21] Appl. No.: 587,492

[22] Filed: Jan. 17, 1996

[30] Foreign Application Priority Data

Jan. 18, 1995 [JP] Japan .................................. 7-005437

[51] Int. Cl.⁶ .................................................. G06F 12/02
[52] U.S. Cl. ............................... 711/173; 711/4; 711/5; 711/115; 711/120
[58] Field of Search .................................. 395/621, 622, 395/652, 430; 365/185.11, 185.29, 185.33; 411/4, 5, 115, 202, 170, 173

[56] References Cited

U.S. PATENT DOCUMENTS

| | | |
|---|---|---|
| 4,791,623 | 12/1988 | Deiotte ......................................... 369/59 |
| 5,355,489 | 10/1994 | Bealkowski et al. .................... 395/500 |
| 5,473,573 | 12/1995 | Rao ..................................... 365/230.01 |
| 5,485,595 | 1/1996 | Assar et al. .............................. 395/430 |
| 5,602,987 | 2/1997 | Harari et al. ....................... 395/182.06 |
| 5,604,887 | 2/1997 | Naidu et al. ............................. 395/500 |
| 5,630,093 | 5/1997 | Holzhammer et al. ................. 395/442 |
| 5,634,050 | 5/1997 | Krueger et al. .......................... 395/616 |

*Primary Examiner*—Eddie P. Chan
*Assistant Examiner*—Than V. Nguyen
*Attorney, Agent, or Firm*—Ostrolenk, Faber, Gerb & Soffen, LLP

[57] ABSTRACT

The present invention sets a first boot record indicating a first file group information on a head address of a non-volatile memory a second boot record indicating a second file group information on an end address of the non-volatile memory without partitioning the non-volatile memory. When accessing to files of first file group, an address is generated based on information on the first boot record. When accessing to files of second file group, an address is generated based on information on the second boot record.

18 Claims, 3 Drawing Sheets

FILE MANAGING DEVICE OF A NON-VOLATILE MEMORY, A MEMORY CARD AND METHOD FOR CONTROLLING A FILE SYSTEM

BACKGROUND OF THE INVENTION

This invention relates to an art for managing file system on a non-volatile memory and, more particularly, to an art for formatting a non-volatile memory and a memory card on which a non-volatile memory is mounted.

A prior file management method of a non-volatile memory is explained, referring to a paper titled "Recent trend: Growing interest in flash memory card" written by Kiyota in the magazine "Nikkei Byte", pp.174–182, June, 1994.

FIG. 3 is a figure for explaining a prior file management method of a non-volatile memory.

In the prior method for controlling a file system of a non-volatile memory, a non-volatile memory 4 is divided into two partitions 4a and 4b. Boot records 40a and 40b are allocated to head addresses of the partitions 4a and 4b, respectively.

The boot records 40a and 40b store information including the number of blocks within the partitions 4a and 4b and a head pointer of the directory structure, i.e., each address of root directories 41a and 41b at initializing the medium.

The root directory 41a stores the address of a directory entry 42a. The partition 4a has sub-directory or file information stored in the root directory 41a dispersed therein. An entry chain is connected with the pointer.

The directory entry 42a comprises a primary area where the next entry address is written, a secondary area originally empty where the entry address after updating the directory is stored and an information area where other information including directory names is stored. The primary area stores address information of the before-updated file entry 43a. The secondary area is empty.

The before-updated file entry 43a comprises a primary area where the next entry address is written, a secondary area originally empty where the entry address after updating the file is stored and an information area where other information including file names or the address of actual file data area is stored. The primary area stores the address information of the next entry. The secondary area stores the address of updated file entry 46a.

The information area stores information including file names or the address of the before-updated file information 44a. In case of tracing the pointer of the before-updated file entry 43a in the primary area, the entry is released and non-usable.

The before-updated file information 44a stores information including the date when the file has been produced, attributes and actual file data area, i.e., the address of the before-updated file 45a.

The updated file entry 46a comprises a primary area, a secondary area and an information area. The primary area stores address information of the next entry. The secondary area is empty. The information area stores file names, address of the updated file information 47a and the like.

The updated file information 47a stores information including the date when the file has been produced, attribute and actual file data area, i.e., the address of the updated file 48a.

Block allocation structure areas 49a and 42b store information including block erasing frequency, non-usable and usable data areas.

In the above-structured memory card 4, when updating the file within the directory entry 42a, information on usable data area stored in the block allocation structure area 49a is referred to. It is further confirmed whether there is sufficient area for storing the updating file or information of the file entry that will be updated accompanied therewith.

If the information on the file or the file entry cannot be written because of insufficient size, garbage collection is executed so as to make usable writing area.

When sufficient size of the area is prepared for storing the information of the file or the file entry, the boot record 40a allocated to the head address of the partition 4a is accessed and the address of the root directory 41a is obtained.

According to the address obtained from the boot record 40a, the root directory 41a is accessed. The address of the directory entry 42a is obtained. According to the obtained address, the directory entry 42a is accessed.

If the directory name registered in the directory entry 42a corresponds with that of the updating file, the address of the before-updated file entry 43a is obtained.

The before-updated file entry 43a is accessed according to the obtained address. If the file name registered in the before-updated file entry 43a corresponds with that of the updating file and the secondary area is empty, the address of unoccupied data area within the partition 4a is written in the secondary area.

At the address of the unoccupied data area, updated file entry 46a is produced. The content of the primary area of the before-updated file entry 43a is written into the primary area of the updated file entry 46a. The information area of the updated file entry 46a stores the file names and the address of the next unused data area.

The updated file information 47a is written at the address of the next unused data area that has been written in the information area of the updated file entry 46a. The address of the next unused data area is assigned. After the updated file 48a is actually written at the assigned address, information of the data area which has been used for the block allocation structure area 49a is added.

While in case of reading the file within the directory entry 42a, the boot record 40a allocated to the head address of the partition 4a is accessed and the address of the root directory 41a is obtained.

The root directory 41a is accessed according to the obtained address. The address of the directory entry 42a is obtained and the directory entry 42a is accessed. If the directory name registered in the directory entry 42a corresponds with that of the file which will be read out, the address of the before-updated file entry 43a is obtained.

When accessing the before-updated file entry 43a according to the obtained address, the address of the updated file entry 46a stored in the secondary area is also obtained. This because the address information is stored both in the primary and the secondary areas.

According to the above-obtained address, the updated file entry 46a is accessed. If the file name registered in the updated file entry 46a corresponds with the one which will be read out and the secondary area is empty, the address of the updated file information 47a stored in the information area is obtained.

According to the obtained address, the updated file information 47a is accessed. Then the address of the updated file 48a is obtained and the updated file 48a as the actual data area is read out.

With the above described prior file management method, the directory or file can be updated by adding the updated entry address in the secondary area of the directory entry or file entry. As a result, this method eliminates the need of block erasing process at every data rewriting. However frequent updating of the file or directory unnecessarily elongates the entry chain, thus requiring a long time for tracing the pointer.

Accompanied with increasing released and non-usable data area, usable area within the partition is decreased. Accordingly the file management method is designed to execute garbage collection at a predetermined timing for erasing the released data area and optimizing the entry chain.

This method controls to prevent a specific block from being erased excessively by using the information of the erasing frequency stored in the block allocation structure area 49a.

The conventional file management method as described above is constructed to divide the memory card into a plurality of partitions. When writing the file in a specific partition, only unoccupied area of the same partition is usable as an available area. The unoccupied area of other partition cannot be effectively used.

As a result, file writing needs frequent garbage collection in the same partition, resulting in a long process time.

Unevenness in the erasing frequency among partitions causes varied erasing frequency among blocks, thus shortening the service life of the memory card as a whole. This is caused by the structure of the managing method in which each partition of the memory card is designed to have independent file management.

Alternatively file managing through classifying file groups by directories instead of dividing the memory card into partitions may cause the entry chain of the directory dr file partially illegible, leading to make the most of those files unaccessible. With this method, since the memory card is not divided into partitions, all the directory or file entries have to be connected from one boot record by means of one pointer chain. This is resulted from no redundancy in the FAT (File Allocation Table) area.

SUMMARY OF THE INVENTION

It is an object of the present invention to solve the above mentioned problems.

It is another object of the present invention to provide a file managing device of a non-volatile memory, a memory card and a method for controlling a file system capable of averaging file writing frequencies.

It is still another object of the present invention to provide a file managing device of a non-volatile memory, a memory card and a method for controlling a file system capable of shortening the file writing time.

It is a further object of the present invention to provide a file managing device of a non-volatile memory, a memory card and a method for controlling a file system capable of prolonging the service life of the non-volatile memory.

The above-mentioned objects are achieved by a file managing device of a non-volatile memory for managing writing/reading files into/from the non-volatile memory, the file managing device comprising: boot record setting means for setting a first boot record indicating a first file group on a head address of the non-volatile memory and setting a second boot record indicating a second file group on an end address of the non-volatile memory.

Moreover, the above-mentioned objects are achieved by a memory card comprising a non-volatile memory to which head address a first boot record indicating first file group information is set and to which end address a second boot record indicating second file group information is set.

Furthermore, the above-mentioned objects are achieved by a method for controlling a file system of a non-volatile memory, comprising steps of: setting first boot record indicating first file group information to a head address of the non-volatile memory; setting second boot record indicating second file group information to an end address of the non-volatile memory; and setting an address for accessing to the non-volatile memory based on the first boot record information when reading/writing files of the first file group, and setting an address for accessing to the non-volatile memory based on the second boot record information when reading/writing files of the second file group.

In the present invention, a non-volatile memory is not divided into a plurality of partitions. Boot records are allocated to the head address and the end address, respectively. The present invention also stores information on block erasing frequency of the non-volatile memory as a whole and usable data area and establishes a block allocation structure area enabling to identify that which file group has been written.

The above function requires no division of the non-volatile memory and allows to use unoccupied area of the non-volatile memory as usable file writing area with high reliability in the same way as obtained by dividing the non-volatile memory into partitions. The garbage collection frequency can be reduced.

As a result, this method shortens file writing time. In case of unevenness in erasing frequency among file groups, block writing frequencies can be averaged so as to prolong the service life of the memory card where rewritable frequency is restricted.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

An embodiment of the present invention is described.

Figure 1:
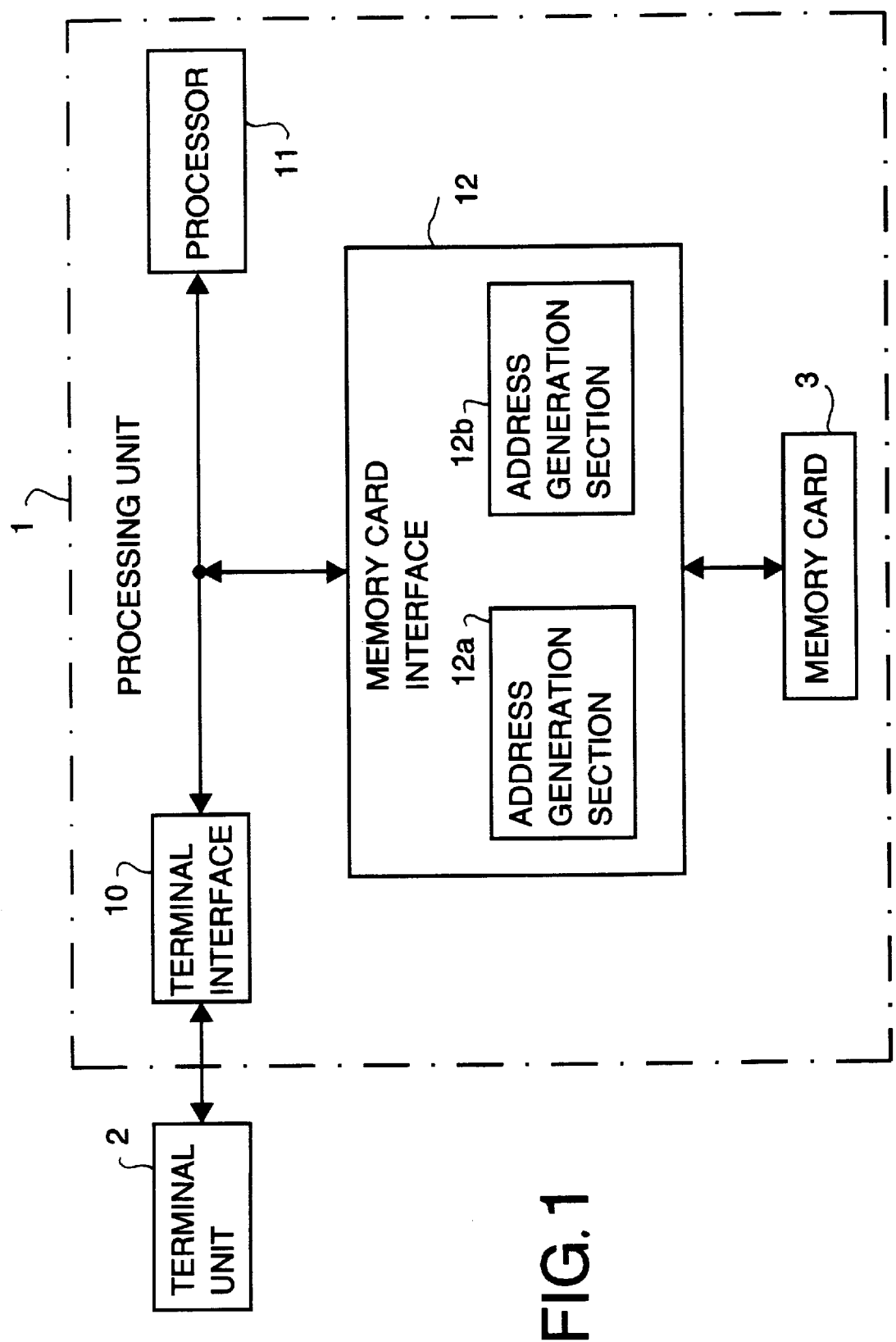
FIG. 1 is a block diagram of an embodiment of the present invention.

FIG. 1 is a block diagram showing a construction of an embodiment of the present invention.

In FIG. 1, a process unit 1 comprises a terminal interface 10 for terminating input/output signals of a terminal unit 2, a processor 11 for producing or updating files in response to an input instruction from the terminal unit 2 and a memory card interface 12 for reading/writing the produced or updated file from/into a non-volatile memory 3A.

The memory card 3 is designed to be detachable to the memory card interface 12 and the non-volatile memory 3A on the memory card 3 stores files. The non-volatile memory 3A, not divided into partitions, has boot records allocated to the head address and end address, respectively for managing two file groups, independently.

The memory card interface 12 has address generation sections 12a and 12b for generating the address when accessing files stored in the non-volatile memory 3A based on the boot records allocated to the head and the end addresses, respectively. Those address generation sections 12a and 12b can be consisted of a software or hardware. For example, the address generation section 12a can be designed to generate the address by addition and the address generation section 12b can be designed to generate the address by subtraction.

Figure 2:
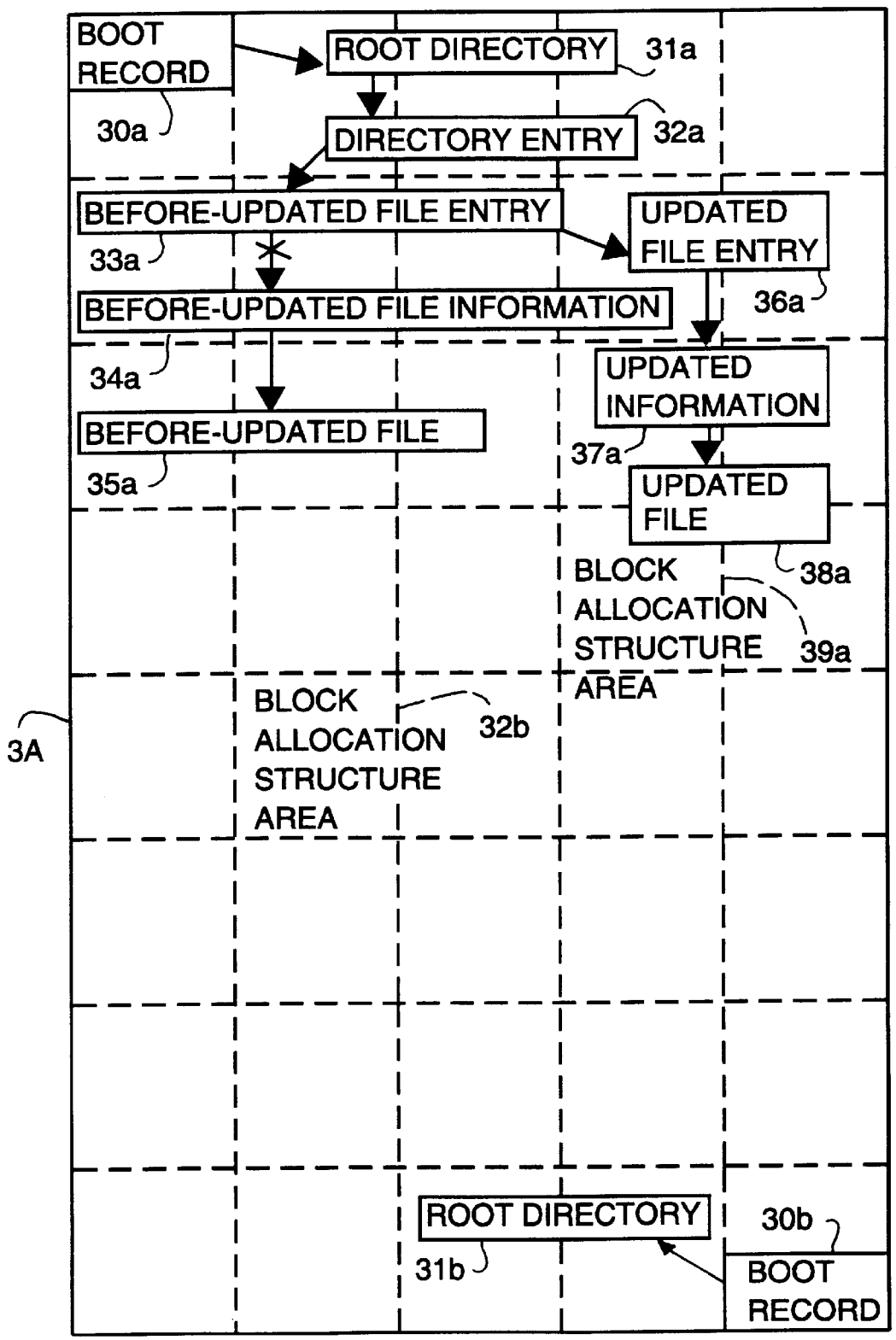
FIG. 2 is a drawing showing a format of a non-volatile memory of the embodiment of the present invention.
Figure 3:
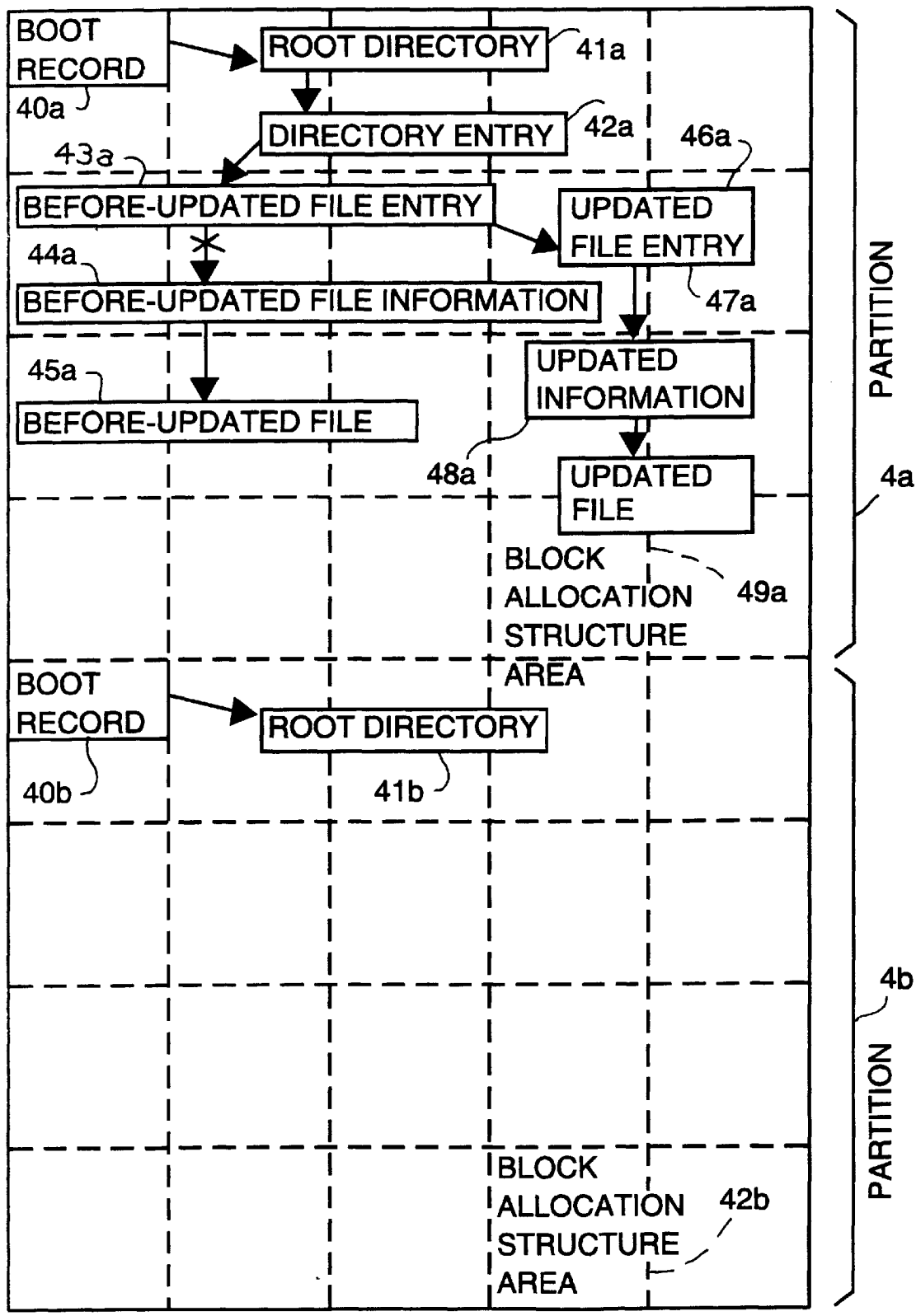
FIG. 3 is a drawing showing a format of a prior non-volatile memory.

FIG. 2 shows a format of the non-volatile memory 3A on the memory card 3 of FIG. 1.

In FIG. 2, the non-volatile memory 3A allocates boot records to the head address and the end address, respectively to manage two file groups independently, without being divided into partitions. Where, the boot record 30a is set in the head address of the non-volatile memory 3A and the boot record 30b is set in the end address of the non-volatile memory 3A.

The boot records 30a and 30b store address information of root directories 31a and 31b, respectively. The root directory 31a stores the address information of a directory entry 32a.

The directory entry 32a comprises a primary area where the next entry address is written, a secondary area originally empty where the entry address after updating the directory is stored and an information area where other information including directory names is stored. The primary area stores the address information of the before-updated file entry 33a. The secondary area is empty.

The before-updated file entry 33a comprises a primary area where the next entry address is written, a secondary area originally empty where the entry address after updating the directory is stored and an information area where other information including file names and address of the actual file data area is stored. The primary area stores the next entry address information. The secondary area stores the address information of the updated file entry 36a. The other information areas store information including file names and address of the before-updated file information 34a.

The before-updated file information 34a stores information including the date when the file has been produced, attributes and actual file data area, i.e., the address of the before-updated file 35a.

The updated file entry 36a comprises a primary area, a secondary area and an information area. The primary area stores the next entry address information. The secondary area is empty. The information area stores file names and address information of the updated file information 37a.

The updated file information 37a stores information including the date when the file has been produced, attributes and actual file data area, i.e., the address of the before-updated file 38a.

Block allocation structure areas 39a and 32b store information including the block erasing frequency, identification of usable or non-usable data area. At this time each data area which has been already occupied has to be identified as to which file group is written therein. Therefore, when storing the occupied data area the block allocation structure areas 39a and 32b identify the group of a file that has been written into the occupied data area.

In the non-volatile memory 3A, the erasable block size is relatively larger than the data writing size. And it comprises a flash memory requiring to average the rewriting frequency so as to prolong its service life.

It is preferable to set the data writing size of the non-volatile memory 3A to 1 byte. The reason is as follows. The data writing size is set to be relatively small in order to store the information of the block erasing frequency and identification of usable data area into the block allocation structure areas 39a and 32a formed of 1 block, in this embodiment. While if the data writing size becomes too small, writing and reading speed is decreased.

Also, it is preferable to set erasing block size to 64k byte. This is because relatively a large erasing size increases the writing/reading speed in this embodiment.

Referring to FIG. 2, a mechanism of the embodiment of the present invention is described. When updating the file within the directory entry 32a, the information is referred to with respect to usable data area stored in the block allocation structure area 39a. It is further confirmed that sufficient area is available so that the updating file and file entry accompanied therewith can be written.

If the area is too small to store the information of the file entry and the like, garbage collection is executed to make usable area.

Once sufficient area is prepared for storing the information of the file, file entry and the like, the boot record 30a allocated to the head address of the non-volatile memory 3A is accessed. The address of the root directory 31a is, then, obtained.

According to the address obtained from the boot record 30a, the root directory 31a is accessed. Then the address of the directory entry 32a is obtained and the directory entry 32a is accessed according to the address.

If the directory name registered in the directory entry 32a corresponds with that of the file to be updated, the address of the before-updated file entry 33a is obtained.

According to the obtained address, the before-updated file entry 33a is accessed. If the file name registered in the before-updated file entry 33a corresponds with that of the file to be updated and the secondary area is empty, the address of the unoccupied data area within the non-volatile memory 3A is written in the secondary area.

The updated file entry 36a is produced at the address of the unoccupied data area. The content of the primary area of the before-updated file entry 33a is written into the primary area of the updated file entry 36a. The information area of the updated file entry 36a stores file names and the address of the unoccupied data area.

The updated file information 37a is written at the address of the next unoccupied data area which has been written into the information area of the updated file entry 36a. The address of the next unoccupied data area is assigned. After updated file 38a is actually written at the assigned address, the data area information used for the block allocation structure areas 39a and 32b is added.

While if reading the file within the directory entry 32a, the boot record 30a allocated to the head address of the non-volatile memory 3A is accessed and the address of the root directory 31a is obtained.

According to the obtained address, the root directory 31a is accessed. According to the obtained address of the directory entry 32a, the directory entry 32a is accessed. If the directory name registered in the directory entry 32a corresponds with that of the file to be read, the address of the before-updated file entry 33a is obtained.

In case that the before-updated file entry 33a is accessed according to the obtained address, the address of the updated file entry 36a stored in the secondary area is also obtained. This is because the address information is stored in both the primary and the secondary areas.

According to the above-obtained address, the updated file entry 36a is accessed. If the file name registered in the updated file entry 36a corresponds with that of the file to be read and the secondary area is empty, the address of the updated file information 37a stored in the information area is obtained.

The updated file information 37a is accessed according to the obtained address. After the address of the updated file 38a is obtained, the updated file 38a is read as the actual data area.

In order to write and read the other file group, the address of the boot record 30b allocated to the end address of the non-volatile memory 3A is obtained. The process after obtaining the address of the boot record 30b onward is the same as described above.

In the aforementioned file management method, directory or file can be updated by adding the updated entry address into the secondary area of the directory entry or file entry. As a result, the method eliminates the need of block erasing at every data rewriting. However frequent updating of the file or the directory elongates the entry chain, thus requiring a long time for tracing the pointer.

Accompanied with increasing released and non-usable data area, the usable data area in the non-volatile memory 3A is decreased. The file management method of the present invention is designed to execute garbage collection at a predetermined timing for erasing the released data area and optimizing the entry chain.

The information on erasing frequency stored in the block allocation structure areas 39a and 32b is used for preventing a specific block from being erased excessively.

In the embodiment of the present invention, the non-volatile memory 3A is not divided into two partitions. Therefore all the unoccupied areas are usable as available areas where any of two file groups can be written. Since the garbage collection has to be executed by the respective groups independently, it is necessary to control not to write both file groups in the same block.

The processor 11 sets the boot records 30a, 30b and block allocation structure areas 39a, 32b through the memory card interface 12.

The address generation sections 12a and 12b of the memory card interface 12 generates addresses of the boot records 30a, 30b, root directories 31a, 31, directory entry 32a, before-updated file entry 33a, before-updated file information 34a, before-updated file 35a, updated file entry 36a, updated file information 37a and updated file 38a.

As aforementioned, the boot records 30a and 30b representing at least the file writing information are allocated to the head address and the end address of the non-volatile memory 3A. According to these boot records 30a and 30b, the block allocation structure areas 39a and 32b can be provided for generating the address for accessing the non-volatile memory 3A and storing information on the block erasing frequency of the memory card 3 as a whole and identification of the usable data area. Accordingly in spite of unevenness in erasing frequency between two file groups, block writing frequencies can be averaged, thus prolonging the service life of the non-volatile memory 3A where rewritable frequency is restricted.

Since all the unoccupied area of the non-volatile memory 3A can be efficiently used as the available area for file writing, the frequency of garbage collection can be decreased. Reducing the block erasing frequency can shorten the file writing time.

In addition, in order to manage each file group of the non-volatile memory 3A independently, the boot records 30a and 30b are allocated to the head address and the end address of the non-volatile memory 3A, respectively. So this method is able to keep high reliability in the same way as that obtained from being divided into partitions.

What is claimed is:

1. A file managing device for a non-partitioned non-volatile memory, said file managing device comprising:
    a first boot record storing means for storing a first boot record indicating information of a first file group at a head address of said non-partitioned non-volatile memory; and
    a second boot record storing means for storing a second boot record indicating information of a second file group at an end address of said non-partitioned non-volatile memory.

2. The file managing device of claim 1, further comprising:
    first address generation means for generating an address for accessing a file of said first file group based on information contained in said first boot record; and
    second address generation means for generating an address for accessing a file of said second file group based on information contained in said second boot record.

3. The file managing device of claim 1, further comprising:
    means for establishing a block allocation structure area in said non-volatile memory, where said block allocation structure area stores erasing frequency information of each block of said non-volatile memory and information on usable data areas.

4. The file managing device of claim 3, wherein said means for establishing a block allocation structure area identifies an occupied area whether said occupied area is occupied by said first file group or said second file group and stores said occupied area into said block allocation structure area.

5. The file managing device of claim 3, wherein said means for establishing a block allocation structure area establishes two of said block allocation structure areas on said non-volatile memory.

6. The file managing device of claim 1, further comprising writing means for writing data into said non-volatile memory in a unit of 1 byte.

7. The file managing device of claim 1, further comprising erasing means for erasing information within a block of said non-volatile memory in a unit of 64k byte.

8. A file managing device of a non-partitioned non-volatile memory, a memory card and method for controlling a file system, said file managing device comprising:
    means for storing a first boot record indicating information of a first file group at a head address on said non-volatile memory without partitioning said non-volatile memory;
    means for storing a second boot record indicating information of a second file group, at an end address on said non-volatile memory without partitioning said non-volatile memory;
    first address generation means for generating an address for accessing to files of said first file group based on said information of said first boot record;
    second address generation means for generating an address for accessing files of said second file group based on said information of said second boot record; and means for allocating two of block allocation structure areas on said non-volatile memory, wherein each of said block allocation structure area stores block erasing frequency information of each block, information on areas not used for said first file group, information on areas not used for said second file group, and information on usable areas.

9. A non-partitioned, non-volatile memory comprising:
a plurality of memory cells including a head plurality of memory cells located at head address of said memory and an end plurality of memory cells located at an end address of said memory;
a first boot record contained in said head plurality of memory cells, said first boot record indicating information related to a first file group; and
a second boot record contained in said end plurality of memory cells, said second boot record indicating information related to a second file group, wherein each of said first and second file groups can be stored anywhere throughout said plurality of memory cells.

10. The memory of claim 9, wherein said non-partitioned non-volatile memory includes a block allocation structure area storing erasing frequency information of each block and information of usable data areas.

11. The memory of claim 10, wherein said block allocation structure area stores an occupied area after identifying an occupied area whether said occupied area is occupied by said first file group or said second file group.

12. The memory of claim 10, wherein two of said block allocation structure area are allocated on said non-partitioned non-volatile memory.

13. The memory of claim 9, further comprising a connector on said non-partitioned non-volatile memory for connecting said non-volatile memory with a read and write device.

14. The memory of claim 9, wherein said non-partitioned non-volatile memory is a flash memory.

15. A method for controlling a file system of a non-partitioned non-volatile memory, comprising steps of:
a first boot record indicating information of storing a first file group at a head address of said non-volatile memory;
storing second boot record indicating information of a second file group at an end address of said non-volatile memory; and
generating an address for accessing a file of said first file group based on information of said first boot record when reading or writing files of said first file group, and generating an address for accessing a file of said second file group based on said information of second boot record when reading or writing files of said second file group.

16. The method for controlling a file system of a non-partitioned non-volatile memory of claim 15, further comprising a step of allocating a block allocation structure area on said non-partitioned non-volatile memory, wherein said block allocation structure area stores erasing frequency information of each block of said non-partitioned non-volatile memory and information on usable data areas.

17. The method for controlling a file system of a non-partitioned non-volatile memory of claim 16, wherein said step of allocating a block allocation structure area identifies an occupied area whether said occupied area is occupied by said first file group or said second file group and stores said occupied area into said block allocation structure area.

18. The method for controlling a file system of a non-partitioned non-volatile memory of claim 15, wherein said steps of storing said first boot record and said second boot record do not need to partition said non-partitioned non-volatile memory for storing said first boot record and said second boot record.

* * * * *